(12) United States Patent
Güntherberg et al.

(10) Patent No.: US 6,174,958 B1
(45) Date of Patent: Jan. 16, 2001

(54) THERMOPLASTIC MOULDED MATERIALS BASED ON POLYCARBONATES AND STYRENE/ACRYLONITRILE POLYMERS WHICH CONTAIN COPOLYMERS BASED ON ALKYL(METH)ACRYLATE TO IMPROVE THEIR PROPERTIES

(75) Inventors: Norbert Güntherberg, Speyer; Martin Weber, Maikammer, both of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/194,128

(22) PCT Filed: May 28, 1997

(86) PCT No.: PCT/EP97/02791

§ 371 Date: Nov. 23, 1998

§ 102(e) Date: Nov. 23, 1998

(87) PCT Pub. No.: WO97/45484

PCT Pub. Date: Dec. 4, 1997

(30) Foreign Application Priority Data

May 30, 1996 (DE) .............................. 196 21 733
May 30, 1996 (DE) .............................. 196 21 731

(51) Int. Cl.⁷ .............................. C08L 69/00; C08L 51/04
(52) U.S. Cl. .............................. 525/67; 525/133; 525/148
(58) Field of Search .............................. 525/67, 133, 148

(56) References Cited

U.S. PATENT DOCUMENTS

| | | |
|---|---|---|
| 2,820,773 | 1/1958 | Childers et al. . |
| 3,480,598 | 11/1969 | Nield . |
| 4,224,419 | 9/1980 | Swoboda et al. . |
| 4,472,554 | 9/1984 | Grigo et al. . |
| 4,584,360 | 4/1986 | Paul et al. . |
| 4,605,699 | 8/1986 | Mitulla et al. . |
| 4,631,311 | 12/1986 | Wingler et al. . |
| 4,634,734 | 1/1987 | Hambrecht et al. . |
| 4,683,265 | 7/1987 | Kress et al. . |
| 4,732,949 | 3/1988 | Paul et al. . |
| 4,788,253 | 11/1988 | Hambrecht et al. . |
| 4,833,221 | 5/1989 | Albrecht . |
| 4,880,875 | 11/1989 | Wassmuth et al. . |
| 4,895,898 | 1/1990 | Kress et al. . |
| 5,189,100 | 2/1993 | Fischer et al. . |
| 5,196,480 | 3/1993 | Seitz et al. . |
| 5,232,986 | 8/1993 | Fischer et al. . |
| 5,290,859 | 3/1994 | Niessner et al. . |
| 5,393,836 | 2/1995 | Niessner et al. . |

FOREIGN PATENT DOCUMENTS

| | | |
|---|---|---|
| 4211061 | 4/1992 | (DE) . |
| 135492 | 3/1985 | (EP) . |
| 356979 | 9/1988 | (EP) . |
| 649166 | 1/1951 | (GB) . |
| 1124911 | 8/1968 | (GB) . |

OTHER PUBLICATIONS

Derwent Abstracts of J60147417, DE1231013, NL6605289, EP111260, DE3149357, EP99532, DE1495089, DE4034336.*

Scholtan et al., *Kolloid–Z u. Z. Polymere* 250, 1972, 782–796.

Vandegaer, J.E. *J. of Appl. Poly. Sci.*, vol. 9, 1965, pp. 2929–2938.

*Kunststoffhandbuch*, vol. V (Polystyrol), Karl–Hanser–Verlag, Munivch, 1969, pp. 118–137.

* cited by examiner

*Primary Examiner*—David J. Buttner
(74) *Attorney, Agent, or Firm*—Keil & Weinkauf

(57) ABSTRACT

Thermoplastic molding materials contain
A) polycarbonates
B) elastomeric graft copolymers,
C+D) two different, thermoplastic copolymers based on styrene or α-methylstyrene,
E) copolymers based on alkyl(meth)acrylate and
F) polymeric, OH-containing compounds.

9 Claims, No Drawings

THERMOPLASTIC MOULDED MATERIALS BASED ON POLYCARBONATES AND STYRENE/ACRYLONITRILE POLYMERS WHICH CONTAIN COPOLYMERS BASED ON ALKYL(METH)ACRYLATE TO IMPROVE THEIR PROPERTIES

The present invention relates to thermoplastic molding materials based on polycarbonates and styrene/acrylonitrile polymers, which contain alkyl(meth)acrylate-based copolymers for improving their properties.

Thermoplastic blends of polycarbonates, elastomeric graft copolymers and styrene copolymers are known as PC/ABS or PC/ASA blends and, owing to their property profile, are used in a wide variety of areas, for example as high-strength shaped articles in automotive construction or for household appliances, electrical appliances or office machines. Such molding materials may be modified according to requirements. German Laid-Open Application 4,211,061 discloses polymer blends of this type which contain polyamides as a further polymeric component. Such polymer blends may also be flameproofed (cf. German Laid-Open Application 4,034,336).

In order to achieve a balanced property profile, further polymer-based additives may be added to these blends. However, this may have an adverse effect on individual properties of the desired property profile. For example, there is a danger of partial mutual incompatibility of the polymers, resulting in a loss of toughness. Moreover, poorer processing stability or reduced heat resistance may result.

EP-A-135 492 describes ABS/PC blends with terpolymers based on styrene/maleic anhydride (S/MAA), which contain a minor amount of $C_1$–$C_3$-alkyl methacrylates as polymerized units. These blends have better impact strength than blends which contain S/MAA copolymers. However, blends having a high MAA content tend to exhibit surface defects under unfavorable processing conditions. EP-A-135 493 describes similar polymer blends to which 1–30% by weight of a polyether/polyester block copolymer are added.

EP-A 455 116 describes polymer blends which contain from 50 to 90% by weight of polymethyl methacrylates, from 5 to 40% by weight of copolymers containing butadiene as a component of the tough phase and from 5 to 40% by weight of polycarbonates. The polycarbonate content improves the toughness and the heat distortion resistance compared with pure polymethacrylate/rubber blends.

German Laid-Open Application DE-OS 3,325,702 describes polycarbonate/rubber blends to which from 0.1 to 15% by weight of a low molecular weight polymer having acidic groups have been added in order to improve the impact strength.

EP-A 210 510 describes thermoplastic molding materials containing from 20 to 80% by weight of a thermoplastic polycarbonate, from 10 to 60% by weight of at least one graft rubber and from 10 to 70% by weight of a copolymer of the SAN type which has a low limiting viscosity (2–10 ml/g). This improves the flowability of the thermoplastic molding materials.

German Laid-Open Application DE-OS 3,514,185 describes thermoplastic molding materials which comprise from 20 to 80% by weight of a polycarbonate, from 10 to 60% by weight of graft rubbers and from 10 to 70% by weight of at least two different copolymers of the SAN type, one of which contains methyl methacrylate as the main component. The materials have good toughness, heat stability and heat distortion resistance. However, nothing is said about the processing stability.

It is an object of the present invention to provide thermoplastic molding materials based on polycarbonates, elastomeric graft copolymers and styrene/acrylonitrile copolymers, which have better processing stability without other properties, for example toughness, being adversely affected.

We have found that this object is achieved and that, surprisingly, molding materials which contain a relatively small amount of a copolymer comprising $e_1$) alkyl methacrylates, $e_2$) maleic acid or maleic anhydride, fumaric acid or maleimide and $e_3$) vinylaromatics (component E) and, if required, a polymeric, OH-containing compound (component F) in addition to polycarbonates (component A), elastomeric graft copolymers (component B) and thermoplastic copolymers based on styrene/acrylonitrile (components C+D) are distinguished by better mechanical properties and higher processing stability than molding materials without the additives E and F.

The present invention therefore relates to thermoplastic molding materials containing, as essential components A) from 10 to 90.9% by weight of at least one aromatic polycarbonate,
B) from 5 to 30% by weight of at least one graft copolymer which is composed of
   $b_1$) from 20 to 80% by weight of a grafting base of at least one elastomeric polymer having a glass transition temperature below 0° C. and
   $b_2$) from 20 to 80% by weight of a graft layer which has a glass transition temperature above 50° C. and is composed of two monomers $b_{21}$) and $b_{22}$),
C) from 2 to 70% by weight of at least one thermoplastic copolymer of
   $c_1$) from 50 to 90% by weight of styrene and
   $c_2$) from 10 to 50% by weight of acrylonitrile, $C_1$–$C_8$-alkyl (meth)acrylate or a mixture thereof,
   having a glass transition temperature above 50° C. and a viscosity number of from 40 to 160 cm$^3$/g,
D) from 2 to 70% by weight of a thermoplastic copolymer which differs from the copolymer C) and contains, as polymerized units,
   $d_1$) from 50 to 99% by weight of styrene, substituted styrenes of the general formula I

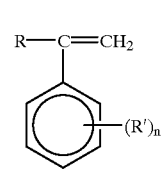

(I)

where R is $C_1$–$C_8$-alkyl or hydrogen, R' is $C_1$–$C_8$-alkyl and n is 0, 1, 2 or 3,
or a mixture thereof and
   $d_2$) from 1 to 50% by weight of acrylonitrile, methacrylonitrile, maleic anhydride, maleimide, which may have a $C_1$–$C_8$-alkyl group or $C_6$–$C_{20}$-aryl group on the nitrogen atom, $C_1$–$C_8$-alkyl (meth)acrylate, (meth)acrylamide, $C_1$–$C_8$-alkyl vinyl ether or a mixture thereof,
E) from 0.1 to 25% by weight of at least one copolymer, composed of
   $e_1$) from 50 to 99% by weight of a mixture of
      $e_{11}$) from 80 to 100% by weight of at least one $C_1$–$C_{10}$-alkyl methacrylate and/or $C_5$–$C_8$-cycloalkyl methacrylate and e$_{12}$) up to 20% by weight of at least one C$_1$–C$_{10}$-alkyl acrylate, e$_2$) from 0.5 to 20% by weight of maleic acid, maleic anhydride, fumaric acid, itaconic acid or maleimide, which may have a C$_1$–C$_8$-alkyl group or C$_6$–C$_{20}$-aryl group on the nitrogen atom, or a mixture thereof and e$_3$) from 0.5 to 40% by weight of at least one vinylaromatic which is unsubstituted or substituted on the aromatic nucleus by one or two C$_1$–C$_4$-alkyl radicals, F) from 0 to 12.5% by weight of at least one polymeric, OH-containing compound and G) from 0 to 50% by weight of additives, assistants and/or fibrous or particulate fillers or a mixture thereof, the amounts by weight of the components E and F together accounting for not more than 25% by weight and the amounts by weight of the components A to G summing to 100% by weight.

The present invention furthermore relates to the use of these thermoplastic molding materials for the production of moldings, including fibers and films, and the moldings, semifinished products or films obtainable from the thermoplastic molding materials.

C$_1$–C$_8$-alkyl and C$_1$–C$_{10}$-alkyl groups are understood below as meaning linear or branched, preferably linear, alkyl groups. They are in particular C$_1$–C$_6$-alkyl. Examples of alkyl are methyl, ethyl, n-propyl, isopropyl, n-butyl, 2-butyl, isobutyl, tert-butyl, n-hexyl and 2-ethylhexyl. Examples of C$_1$–C$_6$-alkylene and C$_2$–C$_6$-alkylidene are methylene, ethylene, ethylidene, 1-methylethylene, 1,3-propylene, 1,1-propylidene, 2,2-propylidene, 2-methylpropylidene, n-butylene, 2-methylbutylene, 1,1-butylidene, 2,2-butylidene, 1,1-pentylidene, 2,2-pentylidene and 3,3-pentylidene. C$_3$–C$_{10}$-Cycloalkyl is to be understood as meaning cycloalkyl which may carry one or more C$_1$–C$_4$-alkyl groups as substituents. Examples of these are cyclopropyl, cyclobutyl, cyclopentyl, methylcyclopentyl, cyclohexyl, methylcyclohexyl, dimethylcyclohexyl and trimethylcyclohexyl. Examples of C$_3$–C$_{10}$-cycloalkylene and C$_3$–C$_{10}$-cycloalkylidene are 1,1- and 1,2-cyclopropylene, 1,1-, 1,2- and 1,3-cyclobutylene, 1,1-, 1,2- and 1,3-cyclopentylene, 1,1-, 1,2-, 1,3- and 1,4-cyclohexylene and the methyl- or ethyl-substituted derivatives thereof, for example 2,2,4-trimethyl-1,1-cyclohexylene. C$_6$–C$_{20}$-Aryl is understood as meaning in particular phenyl or naphthyl, each of which may carry one or more C$_1$–C$_4$-alkyl groups.

The novel thermoplastic molding materials contain, as component A), from 10 to 90.9, preferably from 20 to 86, in particular from 25 to 70, % by weight, based on the total weight of the molding material, of at least one polycarbonate.

Suitable polycarbonates are, for example, those based on bisphenols of the general formula II

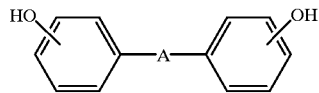

(II)

where A is a single bond, —S—, —SO$_2$—, C$_1$–C$_6$-alkylene, C$_2$–C$_6$-alkylidene, C$_3$–C$_{10}$-cycloalkylene or C$_3$–C$_{10}$-cycloalkylidene.

The preferred bisphenols of the formula II include 4,4'-dihydroxybiphenyl, 4,4'-dihydroxydiphenyl ether, 4,4'-dihydroxydiphenyl sulfide, 4,4'-dihydroxydiphenyl sulfone,
2,2-bis(4-hydroxyphenyl)propane (bisphenol A),
2,4-bis(4-hydroxyphenyl)-2-methylbutane,
2,2-bis(4-hydroxyphenyl)pentane,
1,1-bis(4-hydroxyphenyl)cyclohexane and
1,1-bis(4,4'-hydroxyphenyl)-2,2,4-trimethylcyclohexane.
2,2-Bis(4-hydroxyphenyl)propane and
1,1-bis(4-hydroxyphenyl)cyclohexane are particularly preferred.

Both homopolycarbonates and copolycarbonates are suitable as component A). Homo- and copolycarbonates of bisphenol A are preferred. Copolycarbonates which, in addition to bisphenol A, contain up to 30 mol % of the abovementioned dihydroxy compounds as condensed units are particularly preferred.

The suitable polycarbonates may be branched in a known manner, preferably by the incorporation of from 0.05 to 2.0 mol %, based on the sum of the bisphenols used, of compounds having at least three phenolic OH groups.

Furthermore, the polycarbonates suitable as component A) may be monosubstituted to trisubstituted by halogen, preferably chlorine and/or bromine, on the aromatic units. However, halogen-free compounds are particularly preferred.

Polycarbonates which have relative viscosities $\eta_{rel}$ of from 1.10 to 1.50, in particular from 1.25 to 1.40 (at 25° C. as a 0.5% strength by weight solution in dichloromethane) have proven particularly suitable. This corresponds to weight average molecular weights $M_W$ of from 10000 to 200000, in particular from 20000 to 80000.

The bisphenols of the general formula II are known per se or can be prepared by known methods.

The polycarbonates can be prepared, for example, by reacting the bisphenols with phosgene by the phase boundary method or in the homogeneous phase (ie. the pyridine process), the desired molecular weight being established by means of an appropriate amount of known chain terminators (regarding polydiorganosiloxane-containing polycarbonates, cf. for example German Laid-Open Application DE-OS 3,334,782).

Examples of suitable chain terminators are phenol., p-tert-butylphenol as well as long-chain alkylphenols, such as 4-(1,1,3,3-tetramethylbutyl)phenol, according to German Laid-Open Application DE-OS 2,842,005, or monoalkylphenols or dialkylphenols having a total of 8 to 20 carbon atoms in the alkyl substituents, according to DE-A 35 06 472, for example p-nonylphenol, 3,5-di-tert-butylphenol, p-tert-octylphenol, p-dodecylphenol, 2-(3,5-dimethylheptyl)phenol and 4-(3,5-dimethylheptyl)phenol.

Further suitable polycarbonates are those based on 2,6-dihydroxynaphthalene, hydroquinone or resorcinol.

The novel thermoplastic molding materials contain, as component B), from 5 to 30, preferably from 5 to 25, in particular from 8 to 20, % by weight, based on the total weight of the molding material, of at least one graft copolymer composed of b$_1$) from 20 to 80, preferably from 50 to 70, % by weight of a grafting base of an elastomeric polymer having a glass transition temperature below 0° C. and b$_2$) from 20 to 80, preferably from 30 to 50, % by weight of a graft layer which has a glass transition temperature above 50° C. and is preferably composed of b$_{21}$) from 50 to 90, preferably from 60 to 80, % by weight of styrene or substituted styrenes of the general formula I, and b$_{22}$) from 10 to 50, preferably from 20 to 40, % by weight of acrylonitrile, methacrylonitrile, methyl methacrylate, maleic anhydride, maleimide, which may have a C$_1$–C$_8$-alkyl group or a C$_6$–C$_{20}$-aryl group on the nitrogen atom, (meth)acrylamide, $C_1-C_8$-alkyl vinyl ether or a mixture thereof.

Suitable polymers for the grafting base $b_1$) are those whose glass transition temperature is below 0° C., preferably below −20° C. These include, for example, natural rubber, synthetic rubber based on conjugated dienes, if required with other comonomers, and elastomers based on $C_1-C_{10}$-alkyl esters of acrylic acid, which may contain further comonomers.

Grafting bases $b_1$) based on butadiene, referred to below as $b_{1a}$), are composed of $b_{11a}$) from 50 to 100, preferably from 60 to 100, in particular from 70 to 100, % by weight of butadiene and/or isoprene and $b_{12a}$) up to 50, preferably up to 40, in particular from 10 to 30, % by weight of copolymerizable, ethylenically unsaturated monomers, for example $C_1-C_8$-alkyl vinyl ether, $C_1-C_{10}$-alkyl acrylates, styrene, acrylonitrile, methacrylonitrile and/or methyl methacrylate or mixtures thereof.

Particularly preferred grafting bases $b_{1a}$) are polybutadiene (cf. German Laid-Open Applications DE-OS 1,420,775 and DE-OS 1,495,089) and copolymers of polybutadiene and styrene (cf. GB-A 6 49 166).

Other suitable grafting bases $b_1$) are those which are based on acrylate (grafting base $b_{1b}$) and are composed of $b_{1b}$) from 50 to 99.9, preferably from 55 to 99, in particular from 60 to 90, % by weight of at least one $C_1-C_{10}$-alkyl acrylate, preferably ethyl acrylate, tert-butyl acrylate, isobutyl acrylate, n-butyl acrylate and 2-ethylhexyl acrylate, in particular the two last-mentioned ones, especially n-butyl acrylate as the sole alkyl acrylate, $b_{12b}$) from 0 to 49.9, preferably from 5 to 44.9, in particular from 10 to 39.9, % by weight of a further copolymerizable, ethylenically unsaturated monomer, such as butadiene, isoprene, styrene, acrylonitrile, methacrylonitrile, methyl methacrylate and/or $C_1-C_8$-alkyl vinyl ether (eg. methyl vinyl ether, ethyl vinyl ether or propyl vinyl ether), and $b_{13b}$) from 0.1 to 5, preferably from 1 to 4, % by weight of a copolymerizable polyfunctional, preferably bi- or trifunctional monomer which effects crosslinking. Suitable bi- or polyfunctional crosslinking monomers $b_{13b}$) of this type are those which preferably contain two, if required also three or more, nonconjugated ethylenic double bonds capable of copolymerization. Examples of suitable crosslinking monomers are divinylbenzene, diallyl maleate, diallyl fumarate, triallyl cyanurate and triallyl isocyanurate. The acrylate of tricyclodecenyl alcohol has proven particularly suitable (cf. German Laid-Open Application DE-OS 1,260,135).

Such grafting bases, too, are known per se and are described in the literature, for example in German Laid-Open Application DE-OS 3,149,358.

According to the invention, the molding materials may contain graft copolymers having a grafting base based on polybutadiene $b_{1a}$) or based on alkyl acrylate $b_{1b}$) or mixtures of two graft copolymers having the grafting bases $b_{1a}$) and $b_{1b}$). When mixtures are used, the ratio $b_{1a}$):$b_{1b}$) is preferably from 4:1 to 1:4, in particular from 1:2 to 2:1.

Preferred graft layers $b_2$) are those in which $b_{21}$) is styrene or α-methylstyrene. Particularly preferably used monomer mixtures $b_{21}$) and $b_{22}$) are styrene and acrylonitrile, α-methylstyrene and acrylonitrile, styrene, acrylonitrile and methyl methacrylate or styrene and maleic anhydride. The graft layers are obtainable by copolymerization of the components $b_{21}$) and $b_{22}$). They usually have a glass transition temperature above 50° C.

If the graft copolymer B) contains a grafting base $b_{1a}$) which is composed of polybutadiene polymers, the term ABS rubber is used.

Such grafting bases $b_{1a}$) can be prepared by polymerizing $b_{11a}$) and $b_{12a}$) in aqueous emulsion in a manner known per se at from 20 to 100° C., preferably from 50 to 80° C. The conventional emulsifiers, such as alkali metal salts of alkanesulfonic or alkylarylsulfonic acids, alkylsulfates, fatty alcohol sulfonates, salts of higher fatty acids of 10 to 30 carbon atoms or resin soaps, may be used. The sodium or potassium salts of alkanesulfonates or fatty acids of 10 to 18 carbon atoms are preferably employed. It is advantageous to use the emulsifiers in amounts of from 0.5 to 5, in particular from 0.5 to 2, % by weight, based on the monomers used in the preparation of the grafting base $b_{1a}$). In general, a ratio of water to monomers of from 2:1 to 0.7:1 is employed. The polymerization initiators used are in particular the conventional persulfates, such as potassium persulfate, but redox systems may also be employed. The initiators are generally used in amounts of from 0.1 to 1% by weight, based on the monomers used in the preparation of the grafting base $b_{1a}$). The conventional buffer substances by means of which a pH of, preferably, from 6 to 9 can be established—eg. sodium bicarbonate and sodium pyrophosphate—may be used as further polymerization assistants; furthermore, from 0.1 to 3% by weight of a molecular weight regulator—such as a mercaptan, a terpinol or dimeric α-methylstyrene—may be used in the polymerization.

The exact polymerization conditions, in particular the type, metering and the amount of the emulsifier, are chosen individually within the abovementioned ranges so that the resulting latex of the diene polymer $b_{1a}$) has a $d_{50}$ value of the integral mass distribution (see below) of from about 100 to 750 nm, preferably from 100 to 600 nm. Alternatively, it is also possible to agglomerate an emulsion polymer having average particle sizes of 60–150 nm, as described, for example, in DE-B 2427960. The seed latex process-is also suitable for the preparation of coarse-particled rubber dispersions.

The $d_{50}$ value of the particle size is defined in the usual manner as the weight average of the particle size, as determined by means of an analytical ultracentrifuge by the method of W. Scholtan and H. Lange, Kolloid-Z. und Z.-Polymere 250 (1972), 782–796. The ultracentrifuge measurement gives the integral mass distribution of the particle diameter of a sample. From this it is possible to determine a percentage by weight of particles which have a diameter equal to or less than a certain size. The average particle diameter, which is also referred to as the $d_{50}$ value of the integral mass distribution, is defined as the value at which 50 percent by weight of the particles have a smaller diameter, and 50 percent by weight of the particles a larger diameter, than the $d_{50}$ value.

The latex preferably has a narrow particle size distribution, ie. the quotient $$Q = \frac{d_{90} - d_{10}}{d_{50}}$$

is preferably less than 0.5, in particular less than 0.35.

If the grafting base of the graft copolymers B) is composed of the components $b_{11b}$) and, if required, $b_{12b}$) and $b_{13b}$), the term ASA rubbers is used. Their preparation is known per se and is described, for example, in German Laid-Open Applications DE-OS 2,826,925, DE-OS 3,149,358 and DE-OS 3,414,118.

The preparation of such grafting bases $b_{1b}$) can be carried out in the manner described for the diene-based grafting bases $b_{1a}$). The exact polymerization conditions are chosen so that the resulting latex has a $d_{50}$ value of from 30 to 1000 nm, preferably from 50 to 800 nm.

In some cases, mixtures of grafting bases which have different particle sizes have proven useful. Appropriate products are described in German Laid-Open Application DE-OS 2,826,925 and U.S. Pat. No. 5,196,480. Preferably used mixtures are those in which one polymer type has particle sizes of from 50 to 150 nm and the other has particle sizes of from 200 to 700 nm (bimodal latex).

The graft layer (graft shell) of the graft copolymer can be synthesized in one or more stages, for example in two or three stages. In the case of the one-stage synthesis of the graft shell, a mixture of the monomers $b_{21}$) and $b_{22}$) in the desired weight ratio in the range from 9:1 to 1:1 is polymerized in the presence of the elastomer $b_{1a}$) or $b_{1b}$), in a manner known per se (cf. for example German Laid-Open Application DE-OS 2,826,925), preferably in emulsion (cf. German Patent 1,260,135 and German Laid-Open Applications DE-OS 3,227,555, DE-OS 3,149,357, DE-OS 3,149,358 and DE-OS 3,414,118).

In the case of a two-stage synthesis of the graft shell $b_2$), the 1st stage generally accounts for from 20 to 70, preferably from 25 to 50, % by weight, based on the total graft shell $b_2$). In this stage, preferably only the monomers $b_{21}$) are used.

The further stages of the graft shell generally account for from 30 to 80, in particular from 50 to 75, % by weight, based in each case on $b_2$). Mixtures of the stated monomers $b_{21}$) and the monomers $b_{22}$) in a weight ratio $b_{21}$)/$b_{22}$) of in general from 9:1 to 1:1, in particular from 4:1 to 7:3, are used for their preparation.

If the graft copolymerization is carried out in emulsion, it may be effected in the same system as the polymerization of the grafting base, further emulsifier and/or initiator being added if necessary. These need not be identical to the emulsifiers and initiators used for the preparation of the grafting base $b_1$). In addition, the statements made in connection with the preparation of the grafting base $b_1$) are applicable to the choice of emulsifier, initiator and polymerization assistants. The monomer mixture to be grafted on may be added to the reaction mixture all at once, batchwise in a plurality of stages or, preferably, continuously during the polymerization. The graft copolymerization is advantageously controled so that a degree of grafting of from 10 to 60, preferably from 15 to 45, % by weight results.

The graft copolymer ($b_1+b_2$) has in general an average particle size of, preferably, from 50 to 1000 nm, in particular from 100 to 700 nm, especially from 150 to 600 nm ($d_{50}$ weight average). The conditions during the preparation of the elastomer $b_1$) and during the grafting are therefore preferably chosen so that particle sizes in this range result. Appropriate measures are known and are described, for example, in German Patent 1,260,135, German Laid-Open Application DE-OS 2,826,925 and J. Appl. Polym. Sci. 9 (1965), 2929–2938.

In order to obtain very tough products, it is advantageous to use a mixture of at least two graft copolymers having different particle sizes (cf. German Laid-Open Application DE-OS 2,826,925 and U.S. Pat. No. 5,196,480). One graft copolymer preferably has $d_{50}$ values of from 50 to 180 nm and the other $d_{50}$ values of from 200 to 700 nm. In a particularly preferred embodiment, such mixtures comprising two graft copolymers in a ratio of from 8:2 to 2:8 are used. Such graft copolymers are advantageously prepared starting from the abovementioned bimodal elastomer suspensions (bimodal latices). The chemical composition of the two graft copolymers is preferably the same, although the shell of the coarse-particled graft copolymer may in particular also be synthesized in two stages. Mixtures of the components A and B, the latter comprising a coarse-particled and a fine-particled graft copolymer, are described, for example, in German Laid-Open Application DE-OS 3,615,607. Mixtures of A and B in which B has a two-stage graft shell are described in EP-A 111 260.

The novel thermoplastic molding materials contain, as component C), from 2 to 70, preferably from 4.4 to 70, in particular from 10 to 60, % by weight, based in each case on the total weight of the molding material, of a thermoplastic copolymer composed of $c_1$) from 50 to 90, preferably from 60 to 85, % by weight of styrene and $c_2$) from 10 to 50, preferably from 15 to 40, % by weight of acrylonitrile, $C_1$–$C_8$-alkyl (meth)acrylate, in particular methyl methacrylate, or a mixture thereof.

Copolymers C) are resin-like, thermoplastic and rubber-free. Copolymers of styrene and acrylonitrile are preferred.

The copolymers C) are known per se and can be prepared by free radical polymerization, in particular by emulsion, suspension, solution or mass polymerization, preferably by continuous mass or solution polymerization (cf. Kunststoffhandbuch, Vol. V (Polystyrol), Karl-Hanser-Verlag Munich 1969, page 118 et seq.). They have viscosity numbers (as determined according to DIN 53726 at 25° C., 0.5% strength by weight in dimethylformamide) of from 40 to 160. This corresponds to weight average molecular weights $M_W$ of from $4 \times 10^4$ to $2 \times 10^6$. Polymers having a glass transition temperature above 50° C. are suitable for the novel, thermoplastic molding materials.

The novel molding materials contain, as component D), from 2 to 70, preferably from 4.4 to 70, in particular from 10 to 60, % by weight, based on the total weight of the molding material, of a thermoplastic copolymer which differs from the copolymer C, ie.

which contains styrene, acrylonitrile and/or (meth)acrylate in the same monomer composition as the polymer C but has a lower viscosity number or which has a monomer composition differing from C or which differs from the polymers C with regard to the type of monomers and which contains $d_1$) from 50 to 99, preferably from 55 to 90, in particular from 65 to 85, % by weight of styrene, substituted styrenes of the general formula I, in particular α-methylstyrene, or mixtures thereof and $d_2$) from 1 to 50, particularly from 10 to 45, in particular from 15 to 35, % by weight of acrylonitrile, methacrylonitrile, $C_1$–$C_8$-alkyl (meth)acrylate, in particular methyl methacrylate, maleic anhydride, maleimide, which may have a $C_1$–$C_8$-alkyl group or $C_6$–$C_{20}$-aryl group on the nitrogen atom, (meth)acrylamide, $C_1$–$C_8$-alkyl vinyl ethers or mixtures thereof as polymerized units.

These polymers, too, are known in principle and can be prepared in the manner described for C). Particularly preferred copolymers D) are prepared by copolymerization of the following monomer combinations: styrene with acrylonitrile and, if required, methyl methacrylate; α-methylstyrene with acrylonitrile and, if required, methyl methacrylate; styrene and α-methylstyrene with acrylonitrile and, if required, methyl methacrylate; styrene with maleic anhydride; styrene with maleimide which may carry $C_1$–$C_8$-alkyl or $C_6$–$C_{20}$-aryl groups on the nitrogen atom, and, if required, maleic anhydride.

The novel thermoplastic molding materials contain, as component E), from 0.1 to 25, preferably from 0.2 to 16, in particular from 0.5 to 8, % by weight, based on the total weight of the molding material, of a copolymer which is composed of $e_1$) from 50 to 99% by weight of a mixture of $e_{11}$) from 80 to 100% by weight of at least one $C_1$–$C_{10}$-alkyl methacrylate and/or one $C_5$–$C_8$-cycloalkyl methacrylate and $e_{12}$) up to 20% by weight of at least one $C_1$–$C_{10}$-alkyl acrylate, $e_2$) from 0.5 to 20% by weight of maleic acid, maleic anhydride, fumaric acid, itaconic acid or maleimide, which may have a $C_1$–$C_8$-alkyl group or $C_6$–$C_{20}$-aryl group on the nitrogen atom, or mixtures thereof and $e_3$) from 0.5 to 40% by weight of at least one vinylaromatic which may be substituted on the aromatic nucleus by 1, 2 or 3 $C_1$–$C_4$-alkyl radicals.

The alkyl (meth)acrylates $e_1$) used are in particular methyl (meth)acrylate, ethyl (meth)acrylate, n-butyl, isobutyl or tert-butyl (meth)acrylate, hexyl (meth)acrylates and 2-ethylhexyl (meth)acrylate. Suitable cycloalkyl methacrylates are, for example, cyclopentyl, cycloheptyl and in particular cyclohexyl methacrylate. If required, mixtures of different (meth)acrylates may also be used. $e_{11}$) and $e_{12}$) are preferably (meth)acrylates having the same alkyl groups. The amount of $e_1$) in E is preferably from 65 to 95, in particular from 70 to 80, % by weight. The amount of the monomer component $e_2$) is preferably from 1 to 15, in particular from 5 to 15, % by weight. In particular, styrene and α-methylstyrene which may be substituted by 1 or 2 $C_1$–$C_4$-alkyl radicals are used as vinylaromatics $e_3$). The amount of the monomer component $e_3$) is preferably from 1 to 30, in particular from 5 to 25, very particularly from 10 to 20, % by weight.

The molecular weight of the copolymers E is usually from $2 \times 10^4$ to $10^6$. The preparation of the component E is known per se. It is described in NL-A 6605289, DE-A 1231013, DE-A 1298272, DE-A 3631826, JP-A 85/147417 and EP-A 457147 and is preferably carried out by free radical mass or solution polymerization or by bead polymerization.

The copolymers can advantageously be used in the form of commercial products, for example those having a composition of methyl methacrylate/styrene/maleic anhydride in the weight ratio 75:15:10, obtainable under the name Degalan® HT 120 (Degussa) and Plexiglas® HW 55 (Roehm), or those having a composition of methyl methacrylate/α-methylstyrene/maleic anhydride in the weight ratio 77:15:8, available under the name PLEX® 8707.

The novel thermoplastic molding materials may contain, as component F), up to 12.5, preferably from 0.1 to 10, particularly preferably from 0.2 to 8, % by weight of a polymeric, OH-containing compound. Component E together with component F preferably accounts for 20, in particular 16, % by weight of the molding material. About the same amounts of components E and F are very particularly preferably used. Particularly suitable components F are polycondensates of aliphatic or aromatic diols or alcohols of a higher functionality with epihalohydrins. The aliphatic diols are preferably diols of 2 to 10 carbon atoms, particularly preferably butanediol and/or hexanediol. The aromatic diols are preferably bisphenols, for example the compounds stated for the preparation of the polycarbonates A). Examples of alcohols of higher functionality are in particular mannitol and glycerol. The preferably used epihalohydrin is epichlorohydrin. Particularly preferred compounds F) are condensates of the bisphenols stated for the preparation of the polycarbonates A) with epichlorohydrin. In a particularly preferred embodiment of the invention, a condensate of 2,2-di(4-hydroxyphenyl)propane (bisphenol A) and epichlorohydrin is used, said condensate being commercially available, for example, under the name Phenoxy® (Union Carbide Corporation). Processes for the preparation of such polycondensates as well as the starting compounds are in principle known per se to a person skilled in the art.

Other polymeric, OH-containing compounds may also be used, provided that the components A) to E) are stable in the presence of component F).

The novel thermoplastic molding materials may contain, as component G), up to 50, particularly up to 20, % by weight of fibrous or particulate fillers, additives or assistants or mixtures thereof. These are preferably commercially available products. Processing assistants and stabilizers, such as heat stabilizers and UV stabilizers, lubricants and antistatic agents, are usually used in amounts of from 0.01 to 5% by weight, whereas reinforcing agents, such as carbon fibers and glass fibers, are usually used in amounts of from 5 to 40% by weight, based on the total weight of the molding material.

The glass fibers used may consist of E, A or C glass and are preferably provided with a size and an adhesion promoter. Their diameter is in general from 6 to 20 μm. Both rovings and chopped glass fibers having a length of from 1 to 10 mm, preferably from 3 to 6 mm, may be used.

Furthermore, fillers or reinforcing materials, such as glass beads, mineral fibers, whiskers, alumina fibers, mica, quartz powder and wollastonite, may be present.

Metal flakes (eg. aluminum flakes from Transmet Corp.), metal powders, metal fibers, metal-coated fillers (eg. nickel-coated glass fibers) and other additives which provide shielding from electromagnetic waves may also be present. Aluminum flakes (K 102 from Transmet) are particularly suitable for EMI purposes (electromagnetic interference); a mixture of this material with additional carbon fibers, conductive carbon black or nickel-coated carbon fibers is also possible.

The novel molding materials may furthermore contain additives which are typical, and conventionally used, for polycarbonates, SAN polymers and graft copolymers based on ABS or ASA or mixtures thereof. Examples of such additives are dyes, pigments, antistatic agents, antioxidants and in particular lubricants, which are required for the further processing of the molding material, for example in the production of moldings or shaped articles.

The novel thermoplastic molding materials are prepared by methods known per se, by mixing the components. It may be advantageous to premix individual components. It is also possible to mix the components in solution and remove the solvent.

Suitable organic solvents for the components A) to F) and the additives of group G) are, for example, chlorobenzene, mixtures of chlorobenzene and methylene chloride and mixtures of chlorobenzene and aromatic hydrocarbons, eg. toluene. The solvent mixtures can be evaporated, for example, in devolatilization extruders.

Mixing of the dry components A), B), C), D), E) and, if required, F) and/or G) can be carried out by all known methods.

Thorough mixing is advantageous for obtaining a homogeneous molding material. As a rule, mixing times of from 0.2 to 30 minutes are required for this purpose. Conventional mixing apparatuses are, for example, twin-screw extruders, Banbury kneaders, Brabender kneaders, roll mills or calenders.

This is preferably done at from 200 to 320° C. by extruding, kneading or roll-milling the components together until macroscopic homogeneity of the molding material is achieved, and the components may, but need not necessarily, be isolated beforehand from the solution obtained in the polymerization or from the aqueous dispersion.

However, the components may also be mixed cold without melting, ie. the pulverulent mixture or the mixture consisting of granules is not melted and homogenized until the processing stage.

The novel thermoplastic molding materials may be processed by the known methods for processing thermoplastics, for example by extrusion, injection molding, calendering, blow molding, compression molding or sintering.

The examples which follow illustrate the invention without restricting it.

EXAMPLES

The following components were used:

A) A commercial polycarbonate based on bisphenol A and having a viscosity number VN of 61.4 cm$^3$/g, measured in a 0.5% strength by weight solution in methylene chloride at 23° C. (Makrolon® R 2800 from Bayer AG).

B) Graft copolymer based on butadiene

A polybutadiene latex is prepared by polymerizing 600 g of butadiene in the presence of 6 g of tert-dodecyl mercaptan, 7 g of a sodium $C_{14}$-alkanesulfonate as an emulsifier, 2 g of potassium peroxodisulfate and 2 g of sodium pyrophosphate in 800 ml of water at 65° C. The conversion is 98%. A latex whose average particle size is 100 nm is obtained. The resulting latex is agglomerated by adding 25 g of an emulsion of a copolymer of 96 parts of ethyl acrylate and 4 parts of methacrylamide, having a solids content of 10% by weight, a polybutadiene latex having an average particle size of 350 nm being formed. After the addition of 400 g of water, 4 g of sodium $C_{14}$-alkanesulfonate and 2 g of potassium peroxodisulfate, 400 g of a mixture of styrene and acrylonitrile (70:30) are introduced in the course of 4 hours. The polymerization is carried out with stirring of the batch at 75° C. The conversion, based on styrene/acrylonitrile, is virtually quantitative. The graft rubber dispersion obtained is precipitated by means of a magnesium sulfate solution, and the graft copolymer isolated is washed with distilled water and dried.

C) Copolymer of styrene and acrylonitrile in a weight ratio of 65:35, having a viscosity number of 60 cm$^3$/g (measured according to DIN 53726 in a 0.5 strength by weight solution in dimethylformamide at 23° C.), prepared by continuous solution polymerization by a process as described, for example, in Kunststoffhandbuch, Vieweg/Daumiller, Volume V (Polystyrol), Karl-Hanser-Verlag, Munich 1969, page 124, line 12 et seq.

D) Copolymer of α-methylstyrene and acrylonitrile in a weight ratio of 70:30, having a viscosity number of 58 cm$^3$/g (measured in a 0.5% strength by weight solution in dimethylformamide at 23° C.), prepared by continuous solution polymerization according to German Laid-Open Application DE-OS 2,809,180.

E) Commercial polymer based on methyl methacrylate, styrene and maleic anhydride in a weight ratio of 75:15:10, having a viscosity number of 70±1 cm$^3$/g (measured according to DIN 53726 in a 0.5% strength by weight solution in dimethylformamide (Plexiglas® HW 55, Roehm)

F) Condensate of bisphenol A and epichlorohydrin, having a relative viscosity of 1.13, measured in a 0.5% strength by weight solution in dichloromethane at 25° C. (Phenoxy® from Union Carbide Corporation).

Preparation of the molding materials

Examples 1 to 8

The components A) to F) were mixed in a twin-screw extruder (ZSK 30 from Werner & Pfleiderer) at 250° C. and 200 rpm, extruded, cooled and granulated.

The test specimens were produced in an Arburg Allrounder injection molding machine at 250° C.

The composition of the molding materials is shown in Table 1.

Testing of the material properties

The impact strength and notched impact strength at room temperature and −40° C. were determined according to DIN 53453/ISO 179-2.

The multiaxial impact strength was determined at room temperature and −40° C. according to ISO 6603/4.

The yield stress and the modulus of elasticity E were each determined according to DIN 53455.

The melt volume index MVI was determined according to DIN 53735 at 220° C. and 10 kilopond load, at 260° C. and 5 kilopond load and at 280° C. and 5 kilopond load.

The processing stability was determined on the basis of the MVI values measured after a residence time of 4 minutes (initial value $MVI_4$) and after a residence time of 15 minutes ($MVI_{15}$).

TABLE 1

|  | Ex. 1 | Ex. 2 | CEx. 3 | CEx. 4 | Ex. 5 | Ex. 6 | CEx. 7 | CEx. 8 |
|---|---|---|---|---|---|---|---|---|
| Component A [% by weight] | 30 | 30 | 30 | 30 | 56 | 56 | 56 | 56 |
| Component B [% by weight] | 18 | 18 | 18 | 18 | 18 | 18 | 18 | 18 |
| Component 9 [% by weight] | 9 | 9 | 9 | 9 | 9 | 9 | 9 | 9 |
| Component D [% by weight] | 43 | 43 | 43 | 43 | 17 | 17 | 17 | 17 |
| Component E [% by weight] | 1.5 | 3 | — | — | 1.5 | 3 | — | — |
| Component F [% by weight] | 1.5 | — | 3 | — | 1.5 | — | 3 | — |
| Notched impact strength at 23° C. [kJ/m$^2$] | 31 | 27 | 15 | 21 | 49 | 49 | 34 | 45 |
| Notched impact strength at −40° C. [kJ/m$^2$] | 17 | 16 | 8 | 15 | 11 | 11 | 3 | 11 |
| Impact strength at −40° C. [kJ/m$^2$] | 175 | 168 | 154 | 140 | 330 | 320 | 260 | 320 |
| Multiaxial impact strength at 23° C. [Nm] | 39 | 34 | 19 | 33 | 45 | 43 | 42 | 42 |
| Multiaxial impact strength at −40 C. [Nm] | 9 | 4 | 1 | 2 | 48 | 44 | 33 | 41 |
| MVI (220/10) [ml/10'] | 2.6 | 4.2 | 3.9 | 6.1 | 2.7 | 3.7 | 2.6 | 3.7 |
| MVI (266/5) [ml/10'] | 7.4 | 11.4 | 1 | 15.5 | 7.6 | 8.1 | 1 | 11 |
| $MVI_4$ (280/5) [ml/10'] | 25.2 | 29.5 | 23.0 | 38.7 | 20.0 | 20.2 | 9.2 | 28 |
| $MVI_{15}$ (280/5) [ml/10'] | 24.9 | 32.6 | 6.6 | 35.9 | 20.2 | 24.8 | <0.2 | 39 |
| $MVI_{15}$-$MVI_4$ [ml/10'] | −0.3 | +3.1 | −16.4 | −2.8 | −0.2 | +4.6 | −9 | +11 |

TABLE 1-continued

|  | Ex. 1 | Ex. 2 | CEx. 3 | CEx. 4 | Ex. 5 | Ex. 6 | CEx. 7 | CEx. 8 |
|---|---|---|---|---|---|---|---|---|
| Yield stress [N/mm$^2$] | n.d. | 60 | n.d. | 58 | n.d. | 56 | n.d. | 54 |

CEx. = Comparative Example;
n.d. = not determined

As is evident from Table 1, the mechanical properties, such as impact strengths and yield stress of the molding materials at room temperature and at low temperature, can be improved by adding the essentially brittle component E. The effects are more pronounced in molding materials having a relatively low polycarbonate content. A further improvement in the mechanical properties can be achieved by adding the component F) in combination with component E). On the other hand, the use of the component F) alone leads to a substantial deterioration in the values, even in comparison with molding materials without the additives E) and F).

Regarding the processing stability, it is clear that, by means of the component E), an increase in the molecular weight of the polymer during compounding (negative Δ MVI) is avoided at lower polycarbonate contents (Examples 1 and 2 compared with Comparative Example 4) and an undesired decrease in molecular weight occurs to a lesser extent at higher polycarbonate content (Examples 5 and 6 compared with Comparative Example 8). The use of the components E) and F) together results in molding materials whose MVI values no longer change under the thermal load, which is to be regarded as particularly advantageous. On the other hand, the use of the component F) alone leads to a substantial reduction in the MVI value, indicating an undesired increase in molecular weight.

We claim:
1. A thermoplastic molding material comprising,

A) from 10 to 90.9% by weight of at least one aromatic polycarbonate,
B) from 5 to 30% by weight of at least one graft copolymer which is composed of
 b$_1$) from 20 to 80% by weight of a grafting base of at least one elastomeric polymer having a glass transition temperature below 0° C. and
 b$_2$) from 20 to 80% by weight of a graft layer which has a glass transition temperature above 50° C. and is composed of two monomers b$_{21}$) and b$_{22}$),
C) from 2 to 70% by weight of at least one thermoplastic copolymer of
 c$_1$) from 50 to 90% by weight of styrene and
 c$_2$) from 10 to 50% by weight of acrylonitrile, C$_1$–C$_8$-alkyl (meth)acrylate or a mixture thereof,
 having a glass transition temperature above 50° C. and a viscosity number of from 40 to 160 cm$^3$/g,
D) from 2 to 70% by weight of a thermoplastic copolymer which differs from the copolymer C) and contains, as polymerized units,
 d$_1$) from 50 to 99% by weight of styrene, substituted styrenes of the formula I

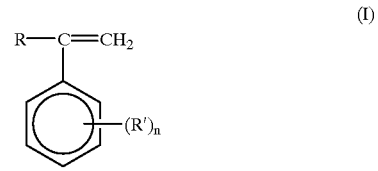

where R is C$_1$–C$_8$-alkyl or hydrogen, R' is C$_1$–C$_8$-alkyl and n is 0, 1, 2 or 3,
 or a mixture thereof and
 d$_2$) from 1 to 50% by weight of acrylonitrile, methacrylonitrile, maleic anhydride, maleimide, which optionally have the C$_1$–C$_8$-alkyl group or C$_6$–C$_{20}$-aryl group on the nitrogen atom, C$_1$–C$_8$-alkyl (meth)acrylate, (meth)acrylamide, C$_1$–C$_8$-alkyl vinyl ether or a mixture thereof,
E) from 0.1 to 25% by weight of at least one copolymer, composed of
 e$_1$) from 50 to 99% by weight of a mixture of
  e$_{11}$) from 80 to 100% by weight of at least one C$_1$–C$_{10}$-alkyl methacrylate or C$_5$–C$_8$-cycloalkyl methacrylate and
  e$_{12}$) up to 20% by weight of at least one C$_1$–C$_{10}$-alkyl acrylate,
 e$_2$) from 0.5 to 20% by weight of maleic acid, maleic anhydride, fumaric acid, itaconic acid or maleimide, which may have a C$_1$–C$_8$-alkyl group or C$_6$–C$_{20}$-aryl group on the nitrogen atom, or a mixture thereof and
 e$_3$) from 0.5 to 40% by weight of at least one vinylaromatic which is unsubstituted or substituted on the aromatic nucleus by one or two C$_1$–C$_4$-alkyl radicals,
F) from 0 to 12.5% by weight of at least one polymeric, OH-containing compound and
G) from 0 to 50% by weight of additives, assistants or fibrous or particulate fillers or a mixture thereof, the amounts by weight of component E and F together accounting for not more than 25% by weight and the amounts by weight of the components A to G summing to 100% by weight.

2. A thermoplastic molding material as claimed in claim 1, consisting of
the component A) in an amount of from 20 to 86% by weight,
the component B) in an amount of from 5 to 25% by weight,
the component C) in an amount of from 4.4 to 70% by weight,
the component D) in an amount of from 4.4 to 70% by weight,
the component E) in an amount of from 0.1 to 16% by weight,
the component F) in an amount of from 0.1 to 10% by weight, the component G) in an amount of from 0 to 20% by weight, with the proviso that the components E and F together account for not more than 20% by weight.

3. A thermoplastic molding material as claimed in claim 1, having a grafting base $b_{1a}$) or $b_{1b}$), wherein the grafting base $b_{1a}$) comprises a copolymer of $b_{1a}$) from 50 to 100% by weight of butadiene or isoprene and $b_{12a}$) up to 50% by weight of copolymerizable ethylenically unsaturated monomers, and the grafting base $b_{1b}$) comprises $b_{11b}$) from 50 to 99.9% by weight of at least one $C_1$–$C_{10}$-alkyl acrylate, $b_{12b}$) from 0 to 29.9% by weight of at least one copolymerizable, ethylenically unsaturated monomer and $b_{13b}$) from 0.1 to 5% by weight of a copolymerizable, poly-functionally crosslinking monomer.

4. A thermoplastic molding material as claimed in claim 1, in which the grafting base $b_1$ comprises a crosslinked butadiene polymer which contains up to 50% by weight of styrene or acrylonitrile as polymerized units.

5. A thermoplastic molding material as claimed in claim 1, in which the graft layer $b_2$) comprises $b_{21}$) from 50 to 90% by weight of styrene or substituted styrenes of the formula I and $b_{22}$) from 10 to 50% by weight of acrylonitrile, methacrylonitrile, methyl methacrylate, maleic anhydride, maleimide which may have a $C_1$–$C_8$-alkyl group or a $C_6$–$C_{20}$-aryl group on the nitrogen atom, (meth)acrylamide, $C_1$–$C_8$-alkyl vinyl ether or mixtures thereof.

6. A thermoplastic molding material as claimed in claim 1, wherein the component B comprises from 20 to 80% by weight of a coarse-particled graft copolymer which has an average particle size of from 200 to 700 nm ($d_{50}$ value of the integral mass distribution) and from 20 to 80% by weight of a fine-particled graft copolymer which has an average particle size of from 50 to 180 nm ($d_{50}$ value of the integral mass distribution).

7. A thermoplastic molding material as claimed in claim 1, in which the component C has a viscosity number of 50–120 cm$^3$/g.

8. A molding composition as claimed in claim 1 wherein the component D comprises at least one of the following copolymers a) styrene with acrylonitrile and optionally methyl methacrylate, b) α-methylstyrene with acrylonitrile and optionally methyl methacrylate, c) styrene and α-methylstyrene with acrylonitrile and, if required, methyl methacrylate, d) styrene with maleic anhydride, e) styrene with maleimide and optionally maleic anhydride, the maleimide being optionally substituated with a $C_1$–$C_8$-alkyl or $C_8$–$C_{20}$-aryl group on the nitrogen atom.

9. A molding, semifinished product or film prepared from the thermoplastic molding material of claim 1.

* * * * *

UNITED STATES PATENT AND TRADEMARK OFFICE
CERTIFICATE OF CORRECTION

PATENT NO. : 6,174,958 B1
DATED : January 16, 2001
INVENTOR(S) : Guentherberg et al.

It is certified that error appears in the above-identified patent and that said Letters Patent is hereby corrected as shown below:

Column 15,
Line 8, "$b_{1a}$)" should be -- $b_{11a}$) --.

Signed and Sealed this

Thirty-first Day of August, 2004

JON W. DUDAS
*Director of the United States Patent and Trademark Office*